Jan. 23, 1968    J. SOLINHAC    3,364,655
DEGASIFICATION PROCESS FOR H$_2$S-CONTAINING LIQUID SULPHUR
Filed July 16, 1965    4 Sheets-Sheet 1

INVENTOR
JEAN SOLINHAC
BY
Bacon & Thomas
ATTORNEYS

Jan. 23, 1968  J. SOLINHAC  3,364,655
DEGASIFICATION PROCESS FOR H$_2$S-CONTAINING LIQUID SULPHUR
Filed July 16, 1965  4 Sheets-Sheet 2
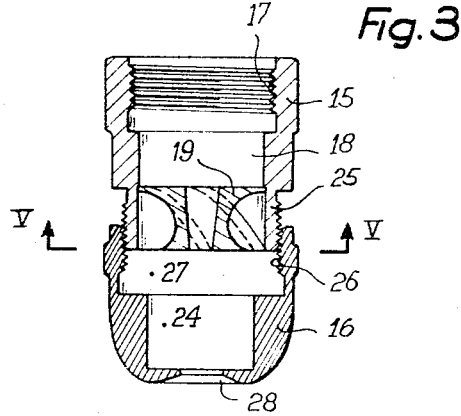
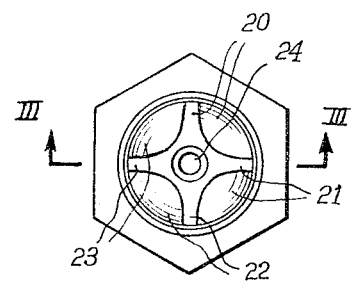
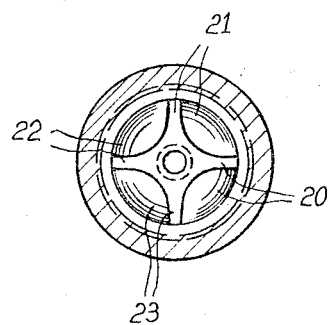
INVENTOR
JEAN SOLINHAC
BY
Bacon & Thomas
ATTORNEYS INVENTOR
JEAN SOLINHAC
BY
Bacon & Thomas
ATTORNEYS United States Patent Office 3,364,655
Patented Jan. 23, 1968

3,364,655
DEGASIFICATION PROCESS FOR H₂S-CONTAINING LIQUID SULPHUR
Jean Solinhac, Amou, France, assignor to Societe Nationale des Petroles d'Aquitaine, Paris, France
Filed July 16, 1965, Ser. No. 472,641
Claims priority, application France, July 27, 1964, 983,086
7 Claims. (Cl. 55—52)

This invention relates to a degasification process for H₂S-containing liquid sulphur.

Transportation tests with liquid sulphur in lorries, wagons and naval tankers have shown that when the H₂S content of the liquid sulphur reaches or exceeds 15 p.p.m. (mg. per kg.), the H₂S content of the volume of gas reaches the bottom inflammability limit, which is 3.6% (36,000 p.p.m. cubic centimetre per cubic metre); at this inflammability threshold iron sulphide forming on the inner walls of mobile tanks acts as a catalyst and results in spontaneous ignition of H₂S without any flame or spark being present.

Also, since H₂S is very noxious, i.e. the atmosphere above the liquid sulphur is progressively dangerous from an H₂S content in excess of 70 p.p.m. (cubic centimetres per cubic metre), handling of these lorries, wagons or naval tankers—and particularly the task of opening the companion of the latter—is very dangerous to the operatives, the fatal threshold for man being 700 p.p.m.

Existing commercial specifications governing handling, transportation and sale of liquid sulphur specify that it must not contain more than 5 p.p.m. of H₂S. To comply with these conditions the H₂S content in excess of 15 p.p.m. must be reduced to the specified level of 5 p.p.m.

Lacq sulphur contains from 70 to 250 p.p.m. of H₂S depending on the works where made. Also, Lacq sulphur is very pure and practically free from organic substances. If the H₂S content is reduced to the threshold value of 5 p.p.m. on leaving the works, this definitely avoids any risk of explosion, spontaneous combustion or asphyxia and the like to operatives.

According to the invention, the liquid sulphur degasification process to reduce the H₂S content of the liquid sulphur is characterised in that jets of liquid sulphur are formed, which are then atomised by projecting them against an obstacle.

According to a first embodiment of the process according to the invention, a solid jet of liquid sulphur is atomised by projecting it against a plate whose plane forms an angle of 135° with the direction of the jet so that the atomised and reflected jets form an angle of substantially 90° with the incident jet.

According to a second embodiment of the process according to the invention, at least two solid liquid sulphur jets are projected against one another at a solid angle in such a manner that they pass through a focus and are violently atomised in the focus which is situated outside the plane of the projection nozzles.

According to a further feature of the second embodiment of the process, three, four or five solid liquid sulphur jets are projected against one another so that their jets form the generatrices of a pyramid whose apex forms the focus through which the jets pass.

According to another feature of the second embodiment of the process, a movement of rotation about the jet axis is imparted to the liquid sulphur jet.

According to another feature of the second embodiment of the process, a plurality of groups of jets forming different foci are used simultaneously.

According to another feature of the process, the speed of the liquid sulphur jet is between 3 and 25 metres per second for a jet diameter between 5 and 15 mm.

According to another feature of the process, 100 kg. of ammonia per 1,000 metric tons of liquid sulphur is added to the liquid sulphur for atomisation.

According to a first embodiment, the atomisation device for performance of the process according to the invention is characterised in that it comprises, a pipe one end of which is provided with a nozzle, said pipe being inclined 15° to the vertical, and a flat plate disposed at a slight distance from the nozzle and forming with the pipe centreline an angle of about 135° so that the incident jet is broken at substantially 90°.

According to a second embodiment, the atomisation system for performing the process according to the invention is characterised in that it comprises at least two nozzles each connected to the liquid sulphur delivery pipe and disposed in the same plane so that their centrelines extended outside the nozzles pass through a common focus.

According to another feature of a second embodiment, the atomisation system comprises, three, four or five nozzles disposed in the same plane and directed towards one another so that their extended centre-lines form the generatrices of a pyramid whose apex forms the focus through which the centre-lines pass.

According to another feature, the atomisation device comprises a plurality of groups of nozzles each connected to the main liquid sulphur delivery pipe.

According to another feature, each nozzle has a cylindrical entry chamber followed by a part with guide blades, said part being formed with a central frusto-conical calibrated bore, a cylindrical mixing chamber downstream of the bladed part and an exit aperture situated on the centre-line of the calibrated bore and downstream of the mixing chamber.

According to another feature, the guide blades of the bladed part are disposed so that their top end is offset 90° from the corresponding bottom end.

According to another feature, the diameter of the exit aperture is greater than the diameter of the bottom end of the calibrated bore.

The subject matter of this invention will be more readily understood from the following description of two embodiments which are given solely by way of example and which are illustrated in the accompanying drawings, wherein:

FIGURE 3 is an axial section of a nozzle of the atomisation system according to FIG. 2, on the line III—III in FIG 4.

FIGURE 4 is a top view of the nozzle according to FIG. 3.

FIGURE 5 is a bottom view of the nozzle on the line V—V in FIG. 3.

Figure 7:
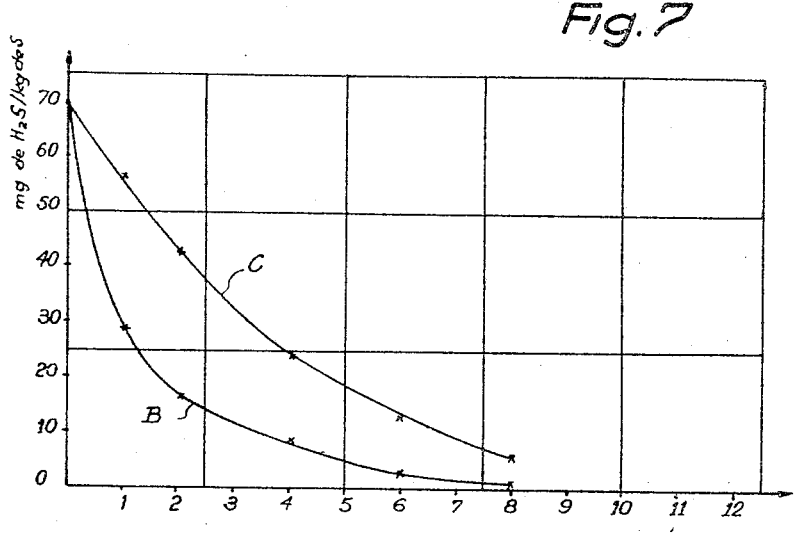
Figure 8:
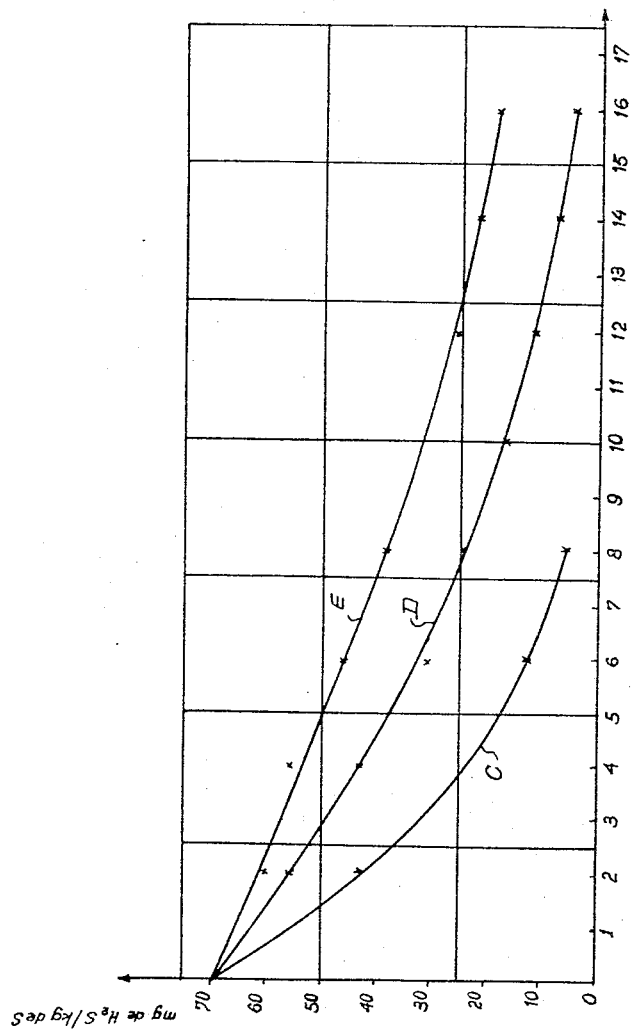

FIGURE 7 is a graph in which the two curves B, C, show the influence of the speed of the liquid sulphur jets in the case of a degasification process according to the invention, and FIGURE 8 is a graph in which the curves C, D, show the influence of the amount of liquid sulphur for degasification on the efficiency of the degasification process, while the curves D, E, show the influence of ammonia on degasification efficiency.

According to a first embodiment of the process, a solid jet of liquid sulphur from a pipe or nozzle 1 inclined 15 degrees to the vertical is applied against a plate 2 which encloses an angle of the order of 135° with the centreline of the pipe 1 so that the incident jet is broken at 90°. In other words, the incident jet and the reflected jet together form an angle of the order of 90°. This liquid sulphur degasification process, which will hereinafter be referred to as a "90° jet break-up process," already has a very high degasification efficiency so that with a given quantity of sulphur initially having a hydrogen sulphide content of 70 p.p.m. two degasification cycles with the given quantity of sulphur are sufficient to give an $H_2S$ content less than 10 p.p.m. The nozzle 1 used in the first embodiment may be of conventional type but the degasification results are improved if the nozzle used complies with the second embodiment of the spraying system as will be described in greater detail hereinafter.

According to a second embodiment of the process according to the invention, at least two solid jets of liquid sulphur are so projected against one another at a solid angle as to cause them to pass through a common focus and atomise the jets violently in the said focus which is situated outside the plane of the projection nozzles. Of course in either case the liquid sulphur is first brought to a temperature of about 125–145° C., at which its viscosity is fairly low. Because sulphur is a thermal insulator the temperature drop from 145° to 125° C. is carried out only within a period of about 60 hours, so that degasification is possible without any re-heating of the sulphur during at least the first two degasification cycles.

According to a preferred embodiment of the invention (see FIG. 2) the spraying device 3 is used, which comprises three projection nozzles 4, 5, 6 disposed in the same plane and each connected by a bend 7, 8, 9 to a liquid sulphur delivery pipe 10. The nozzles 4–6 are uniformly distributed over a circle and are inclined to one another so that the jets 11–13 issuing from the nozzles are made to converge to a common focus 14 situated outside the plane passing through the nozzles 4–6. Of course, 4 or 5 nozzles uniformly distributed over a circle and disposed similarly to the previous arrangement could be used.

The atomisation of the jets results from the impacts between the various particles of the jets. Since the particles atomised in the focus 14 can move in practically every direction, this second embodiment of the process is more effective, i.e. faster, for degasification of liquid sulphur than the first embodiment of the process wherein the jet particles are projected against the plate 2 and are all reflected in the same direction after atomisation.

Each nozzle 4, 5, 6 comprises a body made up of two elements 15, 16 screwed together. As will be apparent from FIGS. 3 to 5, the top element 15 is tapped at 17 to receive the corresponding pipe 7, 8, 9 and has a cylindrical entry chamber 18, a part 19 with guide blades 20–23, a part 19 formed with a central frusto-conical calibrated bore 24, and a screwthreaded part 25 engaging in the corresponding tapped part 26 of the bottom element 16 of the nozzle 4, 5, 6. The bottom element 16 has a cylindrical mixing chamber 27 downstream of the bladed portion 19, and an exit aperture 28 disposed on the centreline of the calibrated bore 24 and downstream of the mixing chamber 27. The diameter of the exit aperture is greater than that of the bottom end of the calibrated bore 24. The top end of each guide blade 20–23 is offset 90° with respect to its corresponding bottom end (see FIGS. 4 and 5). This transmits a rotation to the jet issuing from the aperture 28 and improves the atomisation effect and also the degasification effect.

A plurality of three-nozzle atomisation devices may be connected to a single main liquid sulphur supply pipe.

Figure 1:
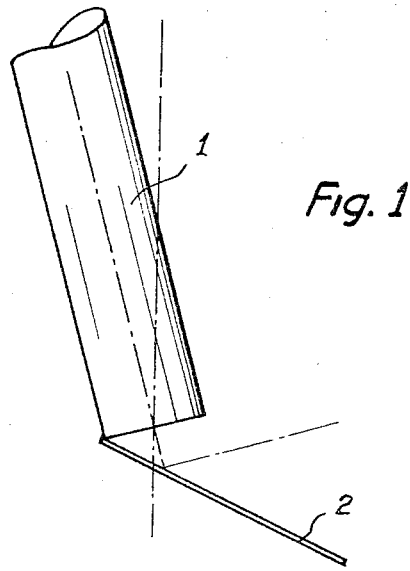
FIGURE 1 is a diagrammatic side view of the atomisation system used for the first embodiment of the process according to the invention.
Figure 2:
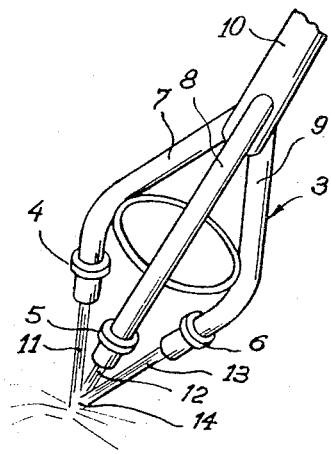
FIGURE 2 is a perspective view of a second embodiment of the atomisation system used for the second embodiment of the process according to the invention.
Figure 6:
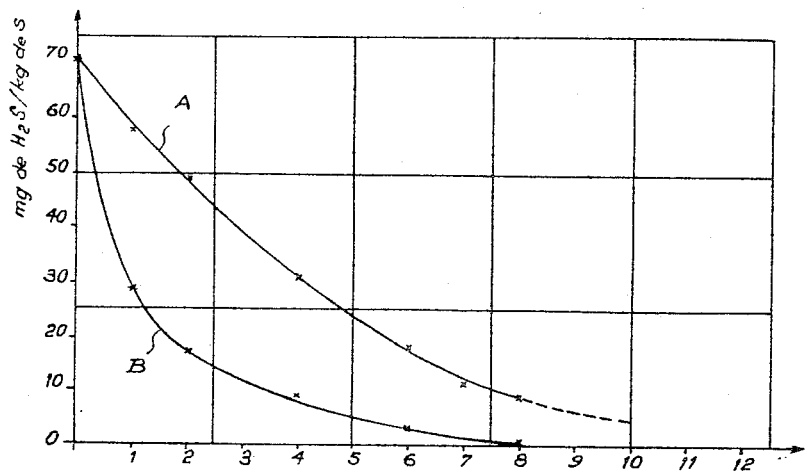
FIGURE 6 is a graph in which the two curves A, B, respectively denote the liquid sulphur degasification results obtained respectively with a first and second embodiment of the process according to the invention.

FIG. 6 is a graph wherein the curve A shows the liquid sulphur degasification results given with the first embodiment of the process, while curve B denotes the degasification results given by the second embodiment of the process according to the invention. In each case the sulphur for degasification was in a closed pit heated to a temperature of 125–145° C. There was 30 metric tons of sulphur. The initial hydrogen sulphide content of the sulphur was 70 p.p.m. The amount of ammonia uniformly added to the liquid sulphur as it was drawn from the pit and delivered to the atomisation device by a pump was 100 p.p.m. In the first case (curve A) three atomisation devices of the kind shown in FIG. 1 were used. In the second case (curve B) the triple-nozzle atomisation device as shown in FIG. 2 was used. The diameter of the exit aperture 28 of each nozzle 4, 5, 6 of the triple-nozzle system was 7 mm. and the diameter of each atomisation pipe of the known device was also 7 mm. The delivery of a triple-nozzle system or of three conventional atomisation devices was 3.825 cubic metres of liquid sulphur per hour which for the given nozzle diameter corresponds to a jet speed of 9.2 metres per second per nozzle or per pipe of the atomisation device. The hydrogen sulphide content was measured in the pit in which the liquid sulphur was stored. The liquid sulphur was atomised in a closed pit some tens of centimetres above the level of the liquid sulphur from which the atomised mass dropped onto the liquid sulphur therein. The pump delivering the sulphur to the atomisation device was immersed in the sulphur at the bottom of the pit. At its top end the pit was connected to a chimney to give a vacuum above the level of the sulphur to allow immediate discharge of $H_2S$ to the chimney by natural draught. In the graphs shown in FIGS. 6 to 8, the x-axis denotes the number of hours of atomisation while the y-axis denotes the $H_2S$ content of the liquid sulphur in the pit.

With reference to curve A in FIG. 6, this curve shows the results obtained with the first embodiment of the process, i.e. the 90° jet break-up process, a quantity of 30 metric tons of liquid sulphur corresponding to a volume of 15.2 cubic metres having undergone two atomisation cycles before its $H_2S$ content dropped below 10 p.p.m. This $H_2S$ content can be obtained with a single atomisation cycle using the second embodiment of the process and of the device according to the invention (curve B). Comparison of curves A and B will show that the second embodiment of the process according to the invention enables the $H_2S$ content to be reduced even more rapidly than is possible with the first embodiment of the process. Because of the initially fairly steep slope of curve B, the saving in degasification time is very considerable and is greater than 100% in the case of $H_2S$ contents greater than 5 p.p.m.

With the two embodiments of the process according to the invention the $H_2S$ content can be reduced to 1 p.p.m. ($H_2S$ in trace form) with either three or two degasification cycles only; this depends on whether the first or second embodiment of the process is used. The addition of ammonia to the liquid sulphur when the latter is applied to the atomisation device is also an important factor. In FIG. 7, curve C denotes results obtained with the triple-nozzle system described hereinbefore but with a jet speed of 4.6 metres per second only. In this case degasification is reduced as compared with degasification with a jet speed of 9.2 metres per second (see curve B) but in this case too a single degasification cycle is enough to reduce the $H_2S$ content to a value of less than 10 p.p.m. while in the case of the first embodiment of the process (jet speed 9.2 metres per second, curve A in FIG. 6) two degasification cycles are required to achieve the same object.

Curves D and E in FIG. 8 show the influence of ammonia on the liquid sulphur degasification. In each case a triple system according to the invention was used. The rate of addition of ammonia was 100 p.p.m. The rate of flow of liquid sulphur per hour and per nozzle was 0.64 cubic metre corresponding to a jet speed of 9.2 metres per second, the amount of liquid sulphur for degasification being 60 metric tons corresponding to a volume of 30.6 cubic metres. Curve D shows the $H_2S$ content obtained with degasification with the addition of ammonia and curve E shows the $H_2S$ content obtained with the same atomisation system according to the invention but without the addition of ammonia. It will be apparent from this graph that to obtain the same $H_2S$ content of 25 p.p.m., for example, 60% more time is required when ammonia is not used for degasification of the sulphur.

The ammonia acts as a catalyst during the degasification of the sulphur and in particular helps to break up the bonds between the molecules of the sulphur and of the hydrogen sulphide. Because the liquid sulphur is at temperatures between 125 and 150° C. and since ammonium sulphide dissociates at temperatures above 118° C., there is no chemical reaction between the ammonia and the hydrogen sulphide.

Of course, the triple-nozzle systems may be replaced by atomisation devices using four, five or even more than five nozzles. The exit aperture diameter of the nozzles will vary between 5 to 15 mm. according to requirements. This obviously depends on the amount of sulphur for treatment and the speed of the jet for optimum degasification. With very large quantities of sulphur for treatment it is advantageous to use a plurality of, for example four, atomisation devices simultaneously and to increase the jet speed for example to 25 metres per second, and the nozzle diameters (up to 15 mm.). For greater clarity, the table below shows the liquid sulphur degasification test conditions and results.

What is claimed is:

1. A process for the degasification of $H_2S$-containing liquid sulphur, characterised in that solid jets of liquid sulphur are formed, which are then atomised by projecting them against an obstacle to thereby remove the $H_2S$ from the liquid sulphur.

2. A process according to claim 1, wherein a jet of liquid sulphur is atomised by projecting it against a plate whose plane forms an angle of 135° with the direction of the jet so that the atomised and reflected jets form an angle of substantially 90° with the incident jet.

3. A process according to claim 1, wherein at least two liquid sulphur jets are projected against one another at a solid angle in such a manner that they pass through a focus and are violently atomised in the focus which is situated outside the plane of the projection nozzles.

4. A process according to claim 1, wherein at least three liquid sulphur jets are projected against one another so that their jets form the generatrices of a pyramid whose apex forms the focus through which the jets pass.

5. A process according to claim 1, wherein a movement of rotation about the jet axis is imparted to the liquid sulphur jet.

6. A process according to claim 1, wherein the speed of the liquid sulphur jet is between 3 and 25 metres per second for a jet diameter between 5 and 15 mm.

7. A process according to claim 1, wherein 100 kg. of ammonia per 1,000 metric tons of liquid sulphur is added to the liquid sulphur for atomisation.

TABLE

| Curve | A | B | C | D | E |
|---|---|---|---|---|---|
| Amount and volume of liquid sulphur in pit | 30 metric tons, 15.3 m.³ | 30 metric tons, 15.3 m.³ | 30 metric tons, 15.3 m.³ | 60 metric tons, 30.6 m.³ | 60 metric tons, 30.6 m.³ |
| Atomisation device, type | First embodiment with "90° jet breakup." | Second embodiment of the "triple-nozzle" type | | | |
| Number of atomisation devices | 3 | 1 | 1 | 1 | 1. |
| Diameter of atomisation nozzle or pipe | 7 mm | 7 mm | 7 mm | 7 mm | 7 mm. |
| Rate of flow of sulphur per atomisation device | 1.275 m.³/h | 3.825 m.³/h | 1.9125 m.³/h | 1.9125 m.³/h | 1.9125 m.³/h. |
| Speed of sulphur jet | 9.2 m./sec | 9.2 m./sec | 4.6 m./sec | 4.6 m./sec | 4.6 m./sec. |
| Observations | 100 mg. of $NH_3$ per kg. of S | 100 p.p.m. of $NH_3$ | | | Without $NH_3$. |
| Degasification time in hours | $H_2S$ in m.g./kg. of S | $H_2S$ in mg./kg. of S | $H_2S$ in mg./kg. of S | $H_2S$ in mg./kg. of S | $H_2S$ in mg./kg. of S |
| 0 | 70 | 70 | 70 | 70 | 70 |
| 1 | 58 | 29 | 56 | | |
| 2 | 49 | 17 | 43 | 56 | 61 |
| 4 | 31 | 9 | 24 | 43 | 56 |
| 6 | 18 | 3 | 13 | 31 | 46 |
| 7 | 12 | | | | |
| 8 | 6 | 1 | 6 | | |
| 10 | | | | 24 | 38 |
| 12 | | | | 17 | 32 |
| 14 | | | | 12 | 26 |
| 16 | | | | 8 | 22 |
| | | | | 5 | 19 |

References Cited

UNITED STATES PATENTS

| | | | |
|---|---|---|---|
| 624,169 | 2/1899 | Bullier | 239—543 |
| 2,948,351 | 8/1960 | Phillips et al. | 55—462 |
| 3,033,278 | 5/1962 | Scarr | 239—552 |
| 1,823,188 | 9/1931 | Bushnell | 23—229 |
| 2,134,347 | 10/1938 | Thompson | 239—487 |

FOREIGN PATENTS

| | | |
|---|---|---|
| 105,058 | 7/1926 | Germany. |
| 272,183 | 6/1927 | Germany. |
| 11,988 | 4/1859 | Great Britain. |
| 548,790 | 8/1942 | Great Britain. |

REUBEN FRIEDMAN, *Primary Examiner.*

C. N. HART, *Assistant Examiner.*